United States Patent [19]
Pray

[11] 3,805,933
[45] Apr. 23, 1974

[54] HYDRAULICALLY OPERATED DISC CLUTCH

[75] Inventor: Lawrence H. Pray, Sterling Heights, Mich.

[73] Assignee: Formsprag Company, Warren, Mich.

[22] Filed: Oct. 19, 1970

[21] Appl. No.: 82,115

Related U.S. Application Data

[63] Continuation of Ser. No. 825,567, May 19, 1969, abandoned.

[52] U.S. Cl. ........................ 192/85 CA, 92/165 PR
[51] Int. Cl. ............................................ F16d 25/08
[58] Field of Search.. 92/165 PR; 192/85 CA, 85 R, 192/110 B, 113 A

[56] References Cited
UNITED STATES PATENTS

| | | | |
|---|---|---|---|
| 3,148,144 | 9/1964 | Brenner et al. | 192/85 CA |
| 3,429,410 | 2/1969 | Hansen | 192/85 CA |
| 3,444,971 | 5/1969 | Davidson | 192/85 CA |

*Primary Examiner*—Benjamin W. Wyche
*Attorney, Agent, or Firm*—Whittemore, Hulbert & Belknap

[57] ABSTRACT

A fixed annular hydraulic cylinder gives radial support for an internal driving sleeve of the clutch, an annular piston internal of the cylinder acting axially through a large diameter needle bearing against a pressure plate splined to the sleeve and a stack of Belleville spring-separated discs sustained by a backing plate splined on the sleeve. Alternating discs of the stack are splined to the sleeve and an output cup or driven member. The circular median line or zone of the needle bearing is in axial alignment with that of the piston, disc stack and pressure and backup plates.

2 Claims, 2 Drawing Figures

INVENTOR.
LAWRENCE H. PRAY.
BY Whittemore, Hulbert
 & Belknap
ATTORNEYS

HYDRAULICALLY OPERATED DISC CLUTCH

This Application is a continuation of Ser. No. 825,567 filed May 19, 1969, now abandoned.

BACKGROUND OF THE INVENTION

1. Field of the Invention

The clutch finds application in the fluid-pressure operated clutch field and, more especially, in the wide segment thereof in which hydraulic clutch-engaging force is transmitted axially from a rotary driving member through multiple, axially stacked discs to an output member. However, equivalents of the multiple stacked disc concept, for example, using a single clutch element directly engaging an output member, may be employed.

More particularly, the invention is adapted for use in torque transmission installations in which the greatest possible economy is required in respect to axial and radial dimensions, yet in which relatively large torsional effects involving heavy radial and axial forces come into ply.

2. Description of the Prior Art

The most pertinent prior art patents of which I am aware are those to Hansen, U.S. Pat. No. 3,429,410 of Feb. 25, 1969 and No. 3,011,608 of Dec. 5, 1961. These relate to hydraulically operated disc clutches, but in each case the disclosed structure presents objections in regard to lack of compactness and limited torque handling capacity, factors mentioned in the Abstract.

SUMMARY OF THE INVENTION

More or less typically, the improved clutch incorporates a hydraulically powered cylinder, shown as being rotatively and axially fixed in nature, within which an annular, axially acting piston releasably compresses a stack of clutch discs to clutch-engage and drive an output member from a coaxial input number. In accordance with the improvement of the invention, the input member is journalled for rotation by and within the cylinder through the agency of a large size radial thrust-type ball bearing, which bearing is sustained against axial movement by a shoulder on the input member. This affords a needed ruggedness of radial bearing support.

Also pursuant to the invention, the piston, as sealed in respect to the cylinder by annular packings on the cylinder and piston, acts axially against a needle bearing unit of large diameter surrounding and spaced radially well outwardly of a driving sleeve representing the input member. However, such spacing is only to the extent that the circular radial mid-zone of the bearing unit substantially coincides with the corresponding circular median zone of the annular piston, also that of the pressure plate, the friction disc stack and the backing plate. That is, the effective zone of force transmission at the needle bearing unit is neither substantially radially inward nor radially outward of the median circular zone of transmission through the piston, all of the clutch discs and the pressure and backing plates. Thus axial clutch-engaging thrust is transmitted through all of these members in a very stable and uniformly distributed manner, without setting up variable bending stresses in any part of the clutch structure.

Coupled with this stability, and the radial bearing strength and stability contributed by the ball bearing on the opposite axial side of the cylinder, the large diameter of the needle bearing affords needed axial thrust receiving capacity due to its relatively low unit loading axial-wise. Equally or more importantly, the axial dimension of the clutch structure as a whole is significantly reduced, as compared with one using an axial thrust bearing unit of a different design, without sacrifice of thrust or torque capacity.

Considered as a whole, the improvement of the invention enables the use of a power input or driving sleeve of increased bore diameter, with increased torque transmitting capacity for a given radially limiting overall dimension. As indicated, a uniform centering of the line of axial force transmission from the pressure piston through the needle bearing and disc stack permits a desirable elimination of extraneous bending stress in the operation of the clutch.

DESCRIPTION OF A PREFERRED EMBODIMENT

Figure 1:
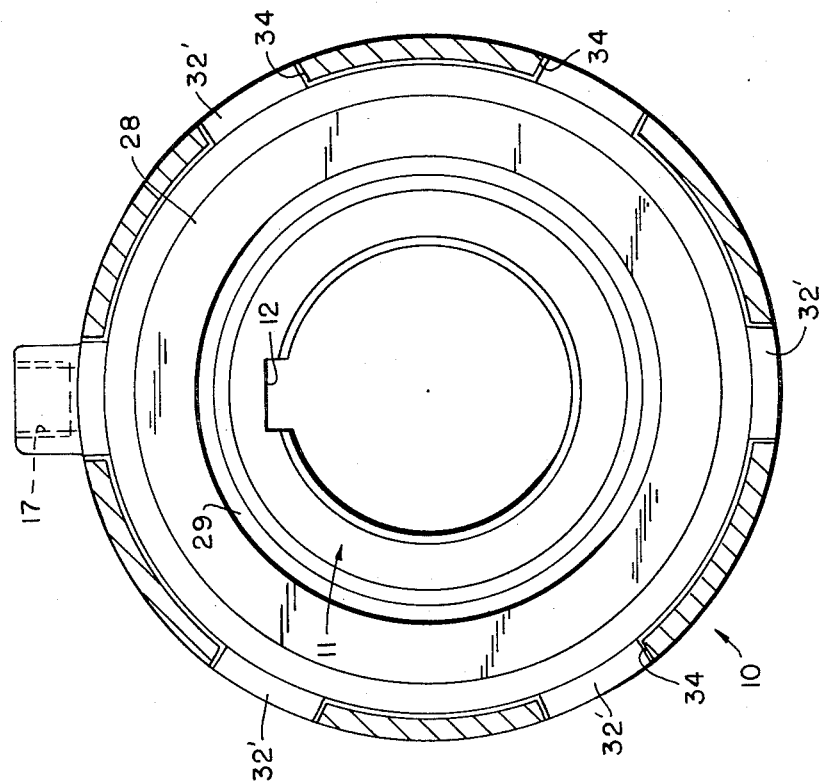
FIG. 1 is a view in transverse vertical section along line 1—1 of FIG. 2.

The clutch of the invention, generally designated by the reference numeral 10, comprises an input or driving sleeve 11 which is internally keyed at 12 to be rotatively operated by an appropriate drive shaft (not shown). This sleeve is rotatably journalled by a very rugged radial thrust-absorbing ball bearing 13, the inner race of which, as secured to rotate with sleeve 11, bears against an axial restraining abutment 14 applied in the manner of a snap ring to sleeve 11. The outer race of bearing 13 is fixedly received in an annular recess 15 opening outwardly of one axial side of a fixed hydraulic power cylinder 16, which cylinder is suitably restrained in any desired manner against rotation, the cylinder thus serving as a strong and stable radial bearing support for the drive sleeve 11. Cylinder 16 has a hydraulic pressure intake port 17 and is formed on its side opposite bearing 13 to provide an annular cylinder recess 18 intermediate its radial limits, this recess being of substantial radial size and opening to the right of the cylinder, as viewed in FIG. 2.

The cylinder recess 18 is communicated directly with the hydraulic pressure intake port 17, and is further defined by radially spaced, coaxial outer and inner walls 19, 20, respectively; these slidably guide an annular piston 22, with annular packings 23 and 24 respectively sealing the piston in relation to the cylinder walls 19 and 20.

Along its right-hand end, the drive sleeve 11 is splined externally at 26 to receive for axially shiftable but rotatively restrained action not only an annular pressure plate 27 of substantial radial width and an axially spaced backing plate 28 rearwardly abutting a snap-type restraining ring 29, but also to receive inner spline formations 30 of alternate, radially inner friction discs 31 of an axial set or stack, the right hand-most of which abuts backing plate 28. Another, radially outer set of friction discs 32 alternate with the discs 31, but are drivingly spline connected to an annular, cup-like output or driven member 33, as by outer ear extensions 32' of these discs taking into radial openings 34 of member 33. A series of Belleville springs 35 are alternately positioned between pressure plate 27, clutch discs 31, 32 and backing plate 28 operate to spread the disc and backing plate members relative to one another when the clutch 10 is in non-clutching condition, i.e., when piston 22 is not subject to hydraulic pressure. Springs 35 of course yield to permit the disc stack to be compressed against plate 28 when hydraulic piston pressure is applied, thus drivingly coupling the torque input member 11 to the output member 33.

The improvement of the invention specially relates to the nature and positioning of an axial thrust sustaining and transmitting needle bearing, generally designated by the reference numeral 36, which is of very substantial diameter, well exceeding that of cylinder wall 20, such that axial force is exerted by hydraulic piston 22 on a cage-type race 37 and needle elements 38 of bearing 36, as confined and disciplined by race 37, through its second flat race 39, with the effective force being exerted along a theoretical annular median zone, in a manner to afford multiple advantages.

That is, the considerable radial size of needle bearing 36, although that size will vary in clutches of varying capacity, suffices to enable its circular radial center median zone to be brought into axial coincidence with an approximate common radial circular center line or common annular median zone of the piston 22, the pressure plate 27, the stack of friction discs 31, 32 and the axially fixed backing plate 28. Thus, regardless of the axial forces involved in the compacting of the disc stack and the subsequent driving therethrough of output cup 33, this drive is stably attained. A constant and uniform distribution of the axial force about the annular members prevents the setting up of any significant bending forces or moments, such as might detract from a smooth and vibration-free characteristic in the repeated clutching and declutching of driver 11 and driven 33.

Furthermore, the use of a needle bearing of the enlarged diameter referred to above, having its median annular zone between inner and outer peripheries substantially coincident with a corresponding zone substantially common to other annular clutch components, also affords a diminution of its unit loading, enabling relatively large axial thrusts to be efficiently transmitted and sustained repeatedly over a long life. Yet the axially compact nature of the needle bearing 36 permits these effects to be had while occupying an absolute minimum of both axial and radial space for a given capacity rating.

Another significant advantage of the invention resides in the fact that the annular piston 22 is provided on its inner periphery with one or more axially extending passages 41 of very slight cross sectional area. These extend between the front and rear axially facing surfaces of piston 22, and provide for the flow of a slight amount of pressure oil past the packing 24 into the zone of needle bearing 36, under the hydraulic piston operating pressure.

Thus, a controlled small volume of a lubricating medium is supplied adjacent the inner diameter of the needle bearing, being centrifically thrown outward past the latter's needle components 38. Internal lubrication of this sort is much preferred to directing an external stream of oil to the needle bearing, because of the tendency of the latter to throw the lubricant away from its own area. A proper operation of the clutch, with insurance against premature failure is the result.

Figure 2:
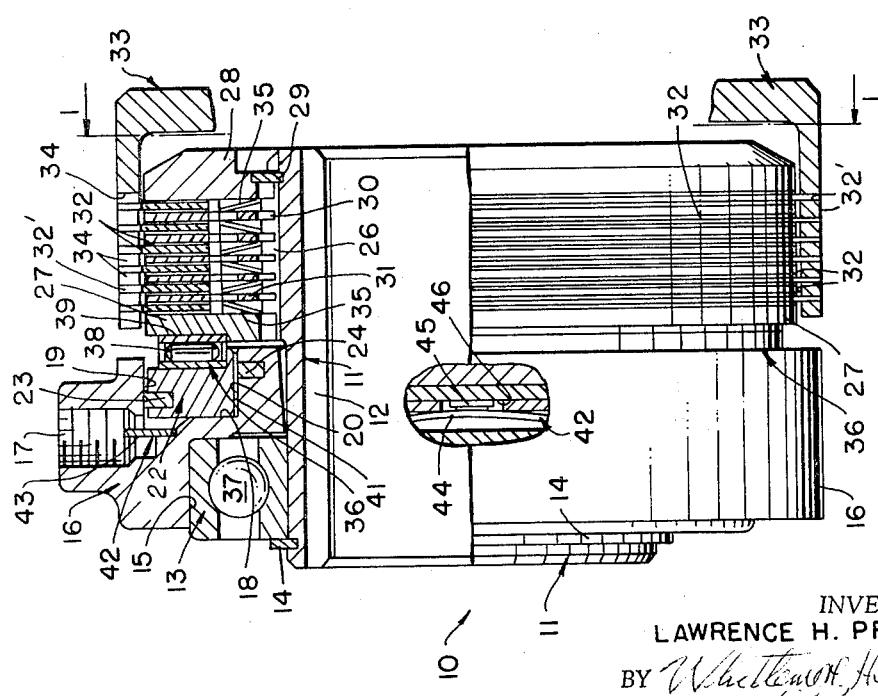
FIG. 2 is a view in side elevation, partially broken away and in section on a radial plane including the axis of the clutch.

Another improved feature of significant merit is one which combats a tendency of the needle bearing 36, due to its inherently relatively high frictional drag, to cause rotation of the piston within its annular cylinder 18. To this end, a wave-type spring 42 is disposed between piston 22 and the radial end wall of the cylinder, spring 42 having an integral radial tang 43 keying into the intake port 17, as shown in FIG. 2. Diametrically opposed radial bulges or humps 44 of spring 42 are formed, preferably by slitting and 180° offsetting, to provide locking lugs or tabs 45; and these key into detent recesses 46 formed in the adjacent radial face of piston 22.

Thus, the piston, as anchored by spring 42, remains stationary in reference to its cylinder 18 despite the circumferential needle bearing drag; and this action persists in any position of axial motion of the piston.

The clutch 10 exhibits a so-called B-10 bearing life capacity, a rating designating statistically the life that 90 percent of a group of bearings will attain.

What is claimed is:

1. A hydraulically operated clutch comprising power input and output members drivingly connected releasably to one another by coaxial annular friction means having parts in rotatively fixed relation to said respective members to transmit rotative force between the latter when compressed axially, and means for the transmission of axial operating force through said compressed friction means, comprising an annular operating member subject to hydraulic pressure in a cylinder space of the clutch, an annular needle bearing interposed between said operating member and said friction means to apply axial clutch-engaging thrust from said operating member to the friction means, and means to prevent substantial rotation of said operating member in relation to said cylinder space under the frictional drag of the needle bearing, comprising an annular, wave-type spring interposed axially between said operating member and a wall part of said cylinder space, said spring having integral portions keyed respectively to the operating member and to a fixed part of the clutch to prevent said rotation of the operating member.

2. The clutch of claim 1, in which said annular needle bearing is of a radius to encircle said input member in substantially outwardly spaced radial relation thereto, a medial annular zone of the needle bearing between inner and outer peripheries of the latter coinciding substantially with a corresponding annular median zone substantially common to said annular friction means and said annular operating member.

* * * * *